|| US007455323B2

(12) United States Patent
Taylor et al.

(10) Patent No.: US 7,455,323 B2
(45) Date of Patent: Nov. 25, 2008

(54) LOTTERY TICKET WITH METALIZED SCRATCHOFF LAYER

(75) Inventors: Brett Charles Taylor, Winnipeg (CA);
Tyson D. Kaus, Winnipeg (CA);
Michael John Brickwood, Winnipeg (CA); Greg Hamilton, Winnipeg (CA);
Lyle Harold Scrymgeour, Oakbank (CA)

(73) Assignee: Pollard Banknote Limited Partnership, Winnipeg, Manitoba (CA)

( * ) Notice: Subject to any disclaimer, the term of this patent is extended or adjusted under 35 U.S.C. 154(b) by 334 days.

(21) Appl. No.: 10/887,458

(22) Filed: Jul. 9, 2004

(65) Prior Publication Data

US 2006/0006639 A1    Jan. 12, 2006

(51) Int. Cl.
*B42D 15/00* (2006.01)
*A63B 71/00* (2006.01)
*A63F 1/08* (2006.01)

(52) U.S. Cl. .................. 283/101; 283/100; 283/903; 428/915; 273/139

(58) Field of Classification Search ................ 428/201, 428/915, 916; 283/72, 94, 95, 100, 101, 283/901, 903; 273/139
See application file for complete search history.

(56) References Cited

U.S. PATENT DOCUMENTS

| | | | | |
|---|---|---|---|---|
| 4,191,376 A | * | 3/1980 | Goldman et al. | 273/139 |
| 4,591,190 A | * | 5/1986 | Clark | 283/102 |
| 4,726,608 A | * | 2/1988 | Walton | 283/96 |
| 4,790,565 A | | 12/1988 | Steed | |
| 4,850,618 A | * | 7/1989 | Halladay, Jr. | 283/94 |
| 4,993,753 A | * | 2/1991 | Weeks | 283/102 |
| 5,585,144 A | * | 12/1996 | Waitts | 427/258 |
| 5,681,065 A | * | 10/1997 | Rua et al. | 283/95 |
| 5,887,906 A | * | 3/1999 | Sultan | 283/94 |
| 5,981,040 A | | 11/1999 | Rich et al. | |
| 6,623,039 B2 | | 9/2003 | Thompson et al. | |
| 2004/0081807 A1 | * | 4/2004 | Bonkowski et al. | 428/195.1 |
| 2004/0150220 A1 | * | 8/2004 | Holmes et al. | 283/110 |
| 2005/0179253 A1 | * | 8/2005 | Rivera et al. | 283/81 |
| 2005/0243391 A1 | * | 11/2005 | Drinkwater | 359/31 |

\* cited by examiner

*Primary Examiner*—Dana Ross
*Assistant Examiner*—Pradeep C Battula
(74) *Attorney, Agent, or Firm*—Adrian D. Battison; Ade & Company Inc.

(57) ABSTRACT

A lottery ticket having a substrate layer with game data printed in a game area and which is arranged to prevent access to the game data from a rear surface of the substrate and has at least one fixing layer applied over the game data in the game area so as to prevent release of the printed game data from the substrate layer and at least one opaque scratch-off layer applied over the sealing layer, the scratch-off layer being arranged such that it separates from the sealing layer and breaks down into fragments when scratched by a player, is modified by the addition of an adhesive layer applied over at least a part of the opaque scratch-off layer and a metal layer attached to the adhesive layer. The metal layer and the adhesive layer are arranged such that they break down into fragments with the scratch-off layer when scratched by the player and may provide both enhanced security and an improved appearance.

10 Claims, 2 Drawing Sheets

LOTTERY TICKET WITH METALIZED SCRATCHOFF LAYER

The present invention relates generally to the field of game or lottery tickets which include a scratch-off layer covering game indicia which can be exposed by the player removing the layer for playing of the game or lottery.

The game provided on each substrate sheet may be for prizes both monetary and product related or may be merely for entertainment where no gambling or prize is involved. The type and value of any prizes can vary widely. The games may be pre-determined, otherwise known as "instant win" tickets or may include elements of skill or chance.

The games concerned are preferably instant win type games where the result is entirely predetermined, since such games are generally preferred in a lottery situation in order to ensure that the total winnings is predetermined. However the present invention is not limited to the type of game to be played and can include probability or other games which include game indicia covered by a scratch-off coating.

The construction may also be used in situations where the main objective is for other purposes than gambling such as in promotional games or games of fun for children or others where no gambling or prizes are involved.

Many such tickets are used directly in a lottery situation so that the tickets have no other relevance other than the playing of the lottery or game by which the player may win monetary or other prizes as part of the lottery or gaming situation. However attention has been recently given to other uses of such tickets such as promotional items used by manufacturers of other products to enhance the sale of the product, or as part of packaging or in other situations where the substrate acts in another capacity and the lottery ticket aspect is merely one part of its function.

The marketing of lottery tickets is primarily based on the psychology of impulse buying so that the ticket itself must be inherently attractive to the potential customer sufficiently to trigger the sale. Particular attention is therefore applied to generating attractive graphics and an attractive appearance of the game face of the ticket.

For this reason high quality graphics and full four colour printing are used in the printing of the product. This is of particular importance in the area at the game data.

Tickets of this type primarily utilize scratch-off technology for covering the game data and techniques for applying the scratch-off coating in a manner which provides the necessary protection and security for the game data have become well established. On top of the scratch-off coating it is common to print additional graphics, often in four colour printing for the purposes of providing the required attractive appearance of the ticket.

It is also known that metalized coatings can be applied to products to provide a reflective appearance which yet further enhances the attractiveness and eye-appeal of the product concerned. Attempts have therefore been made to manufacture lottery tickets which have a metalized or reflective appearance at particular locations on the ticket. Up until now, however, such tickets have been manufactured by utilizing a substrate which is itself formed with a metalized or reflective layer. The printing is then applied on to the metalized layer, with the printing including the necessary coatings for defining the game area, for applying the game indicia and for covering the game indicia with a secure scratch-off coating. Thus tickets of this type have often the metalized or reflective areas in those locations where no printing has been applied and therefore in those areas which are remote from the game indicia. Alternatively, the printing of game data onto a metalized or foil laminated substrate has used an arrangement in which the game data is either printed directly onto the foil or onto a screened white lily pad in the game area so that the ticket retains a metallic appearance in the game area due to this technique. While such tickets have been manufactured, the improvement in attractiveness have generally been insufficient to warrant the additional expense of utilizing the reflective or holographic substrate. Thus such tickets printed onto holographic substrates carry a very high cost and thus are limited to high end products or special events such as Christmas tickets.

Reflective substrates of this type can be embossed with areas of a particular reflective angle so that the surface appears to change as the angle of viewing varies across the surface. This technique is commonly known as "holographic" and is used on many products to define a surface which is highly attractive to the eye.

Up till now such holographic lottery tickets have been manufactured using the above technique in which the substrate itself is holographic and the printed layers are applied on top of the holographic substrate.

The manufacturer of lottery tickets of this type requires a high level of sophistication to ensure the proper levels of security. The ticket must be immune to attack by various techniques including high levels of reflected or transmitted light, attempts to lift or perforate the scratch off coating, chemical or liquid attacks, all of which are designed to expose the game data without removing the scratch-off coating in a manner which indicates that the ticket has been played. Many such lottery tickets have high prize values so that the incentive to breach the security is very high. Certain laboratories have therefore been established to attempt to breach the security of all lottery tickets with only those that pass the rigorous testing being acceptable for sale to the marketplace.

Yet further it is necessary for lottery tickets to have a shelf life of up to two years without degradation of the product leading to the security being breached or the scratch-off coating being difficult to remove.

In order therefore to manufacture an acceptable ticket it is necessary to provide all of the above features.

A promotional coupon having very limited prize value and therefore every low security requirements has been offered for sale utilizing a foil manufactured by API Group PLC of UK which is applied onto an adhesive from Akzo Nobel Inc. The adhesive is applied directly on to the varnish covering the game data printed on to a substrate and the foil is transferred from a carrier onto the adhesive. The intention is that the foil forms a scratchable coating. However this product is unsatisfactory for lottery tickets in that it does not provide the required security nor a suitable scratch off layer which acts in a manner conventionally acceptable in lottery tickets.

SUMMARY OF THE INVENTION

It is one object of the present invention therefore to provide an improved lottery ticket which includes a metalized reflective or metalized holographic appearance at the game data.

According to one aspect of the invention there is provided a lottery ticket comprising:

a substrate layer;

a game area defined on a front surface of the substrate layer;

indicia defining game data printed on the substrate layer in the game area;

the substrate layer being arranged to or having one or more coatings thereon which are arranged to prevent access to the game data from a rear surface of the substrate;

at least one sealing layer applied over the game data in the game area so as to prevent release of the printed game data from the substrate layer;

at least one opaque scratch-off layer applied over the sealing layer, the scratch-off layer being arranged such that it separates from the sealing layer and breaks down into fragments when scratched by a player;

an adhesive layer applied over at least a part of the opaque scratch-off layer;

and a metal layer attached to the adhesive layer;

the metal layer and the adhesive layer arranged such that they break down into fragments with the scratch-off layer when scratched by the player.

In one arrangement, the metal layer may be embossed to provide a holographic effect, but this is not essential and the metal layer may be merely reflective or even matt.

Preferably the adhesive is UV curable since this is advantageous for rapid and simple processing but it is not essential.

In one arrangement, the metal layer and the adhesive layer cover substantially the whole of the game area as a solid block. Alternatively, the metal layer and the adhesive layer may cover only selected areas of the game area.

In this alternative arrangement, there may be applied printed graphics between the areas of the metal layer or onto the metal layer itself.

In a further alternative the metallic layer may be applied over both the game area onto the scratch-off material and onto additional areas directly adjacent the game area or more remote as solid or as defined graphics, in which case the printed layers may be alongside the metallic layer or printed over it.

The substrate layer may be formed by a foil layer or the substrate layer may include card or paper stock covered by coatings arranged to prevent access to game data through the substrate.

Preferably the metal layer comprises a single layer of deposited metal.

Additional printed graphics may be applied onto the metal layer.

According to a second aspect of the invention there is provided a method of manufacturing a lottery ticket comprising:

providing a substrate layer;

defining a game area on a front surface of the substrate layer;

printing indicia defining game data on the substrate layer in the game area;

the substrate layer being arranged to or having one or more coatings thereon which are arranged to prevent access to the game data from a rear surface of the substrate;

applying at least one sealing layer over the game data in the game area so as to prevent release of the printed game data from the substrate layer;

applying at least one opaque scratch-off layer over the sealing layer, applying an adhesive layer over at least a part of the opaque scratch-off layer;

providing a metal layer on a transfer carrier layer;

contacting the metal layer on to the substrate with the adhesive layer exposed thereon such that the metal layer transfers from the carrier layer preferentially onto the adhesive layer leaving other parts of the metal layer which are spaced from the adhesive layer attached to the carrier layer;

and arranging the scratch-off layer with the adhesive layer and the metal layer thereon such that the scratch-off layer, the adhesive layer and the metal layer separate from the sealing layer and break down into fragments when scratched by a player.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
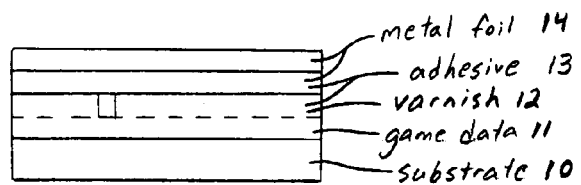
FIG. 1 is a schematic illustration showing the layers of a prior art lottery ticket product.

In FIG. 1 is shown a cross-section of a lottery ticket of the prior art which comprises a paper stock substrate 10. On the substrate is printed game data 11 which is covered by a layer of varnish 12. The varnish 12 is directly covered by a layer of an adhesive 13 onto which is attached a metalized or foil layer 14.

The metalized or foil layer is of a type manufactured by API Group PLC of the UK under the trademark "API die-LESS". This metalized layer can be a simple flat layer formed by depositing metal ions onto a carrier substrate which is then transferred onto the layer of adhesive 13 and the carrier moved away leaving the metal layer preferentially attached to the adhesive after the adhesive has cured. Such metal layers can be simply reflective or can be embossed to provide the known "holographic" effect.

Figure 2:
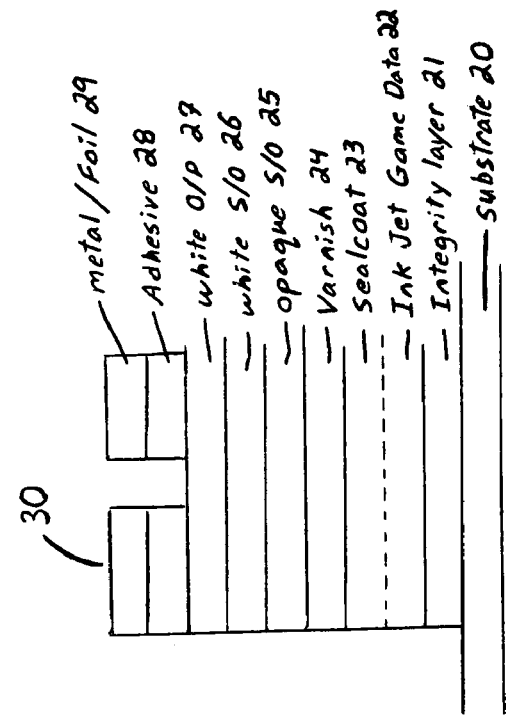
FIG. 2 is a schematic illustration of the layers of a lottery ticket product according to the present invention.
Figure 3:
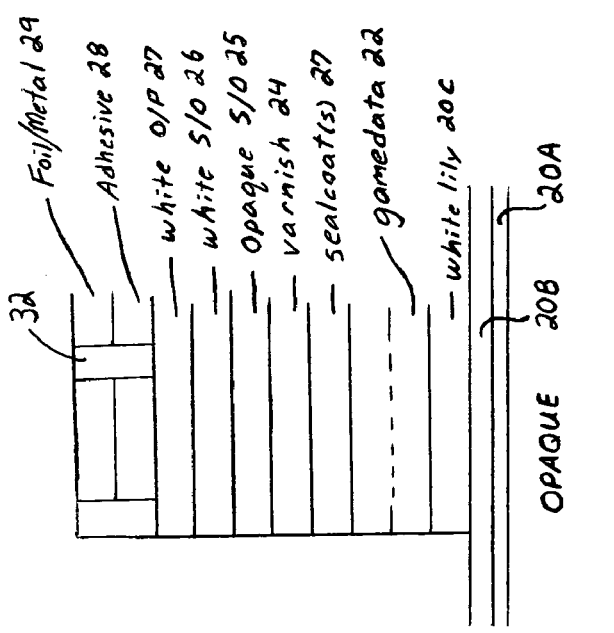
FIG. 3 is a schematic illustration of the layers of a second embodiment of a lottery ticket product according to the present invention.

Turning now to the inventions as shown in FIGS. 2 and 3, in FIG. 2 there is shown a ticket formed of a substrate layer 20 on which is applied one or more integrity layers 21 These are designed to resist chemical or fluid attack through a porous substrate such as paper or card stock attempting to access the game data. On top of the integrity layer or layers 21 is applied the printed game data 22 which is covered by one or more fixing layers such as a seal coat 23 and/or varnish 24 which may prevent chemical attack and which lock the game data physically into place to prevent the game data from being removed by scratching.

On top of the varnish layer 24 is applied one or more scratch off layers 25 which are formed of an opaque or white material. Such opaque scratch off materials are well known and may contain graphite or other black or light impenetrable materials to prevent passage of light in either direction which could reveal information about the game data underneath the scratch-off layers. The scratch-off layers are formed primarily of latex which can breakdown under scratching or friction into fragments. The material itself has no linking materials through its structure so that it cannot be peeled off as a layer but instead simply breaks down into individual fragments or components. Thus the scratch-off layers together combine to form a scratch-off coating which can be removed in a single scratching action breaking down all of the layers to form the composite fragments which breakaway and are discarded. On top of the scratch-off layers is provided a white over printing layer which forms in effect an undercoat for material covering the scratch-off coatings. The integrity layer or layers, the fixing layer or layers and the scratch-off layer or layers are well known to one skilled in the art such that the selection and use thereof as required in any particular construction can be made by the skilled person using conventional knowledge.

On top of the over printing layer 27 is provided a layer of adhesive 28 which carries a metalized or foil layer 29. The adhesive layer 28 and its associated metalized layer 29 may cover the entire region of the game area or may be broken into separate sections which cover individual parts of the game area. The metalized layer 29 is reflective or holographic and thus provides an attractive outer surface 30 which is presented toward the player as the player views the ticket surface.

The adhesive layer and the metalized layer are selected and arranged so that they breakdown when scratched with the scratch off layers 25 and 26 together with the over printing layer 27. Thus the whole of the structure defined by the layers 25, 26, 27, 28 and 29 breaks down into fragments when scratched and cannot be peeled as integral layer.

For this purpose suitable adhesives are selected which do not form an integral bond or link across the area of the adhesive but instead simply provide an adhesive effect between the metal layer and the scratch-off layers so that breaking down of the scratch-off layers also breaks the adhesive into sections also breaking down the metalized layer into sections.

The metalized section therefore has a thickness which is sufficiently thin to prevent the metalized layer from having structural strength and merely provides a decorative coating. The thickness therefore is sufficient simply to provide the reflective appearance or the holographic appearance obtained by embossment. The thickness is therefore preferably less than 0.010 inch and more preferably in the range 0.002 to 0.009 inch. This thickness of metal layer can be carried on a carrier sheet having a thickness of the order of the range 0.048 and 0.060 inch.

As the adhesive layer 28 and the metalized layer 29 are not required to cover the game data, they may be arranged as simple decoration over small parts or larger parts as required of the game area. Additional adhesive and additional metalized layer parts may also be applied to other areas of the lottery ticket to match or mirror or co-operate with parts in the game area to provide a whole attractive appearance defined by the total graphics on the lottery ticket.

In FIG. 3 is shown an alternative embodiment similar to that of FIG. 2 in which the card or paper substrate 20 is replaced by a substrate 20A which is covered by a layer of foil 20B. The foil is wholly opaque and moisture impermeable so that there may be no requirement for any layers similar to the integrity layer or layers 21. In their stead is provided a layer 20C simply of a white ink which forms a white base for receiving the game data 22. Again the layers necessary for printing on a foil substrate are known to one skilled in the art.

A further modification is shown in FIG. 3 in which additional printing layers 32 are provided in the areas between the sections of adhesive layer 28 and associated metallic layer 29. Thus the whole of the game area is covered either by additional printing layers 32 or by the metallic layer 29 so that the whole of the game area is either printed in various colours or covered by the reflective or metalized layer 29 providing a whole graphics area over the game area.

Figure 4:
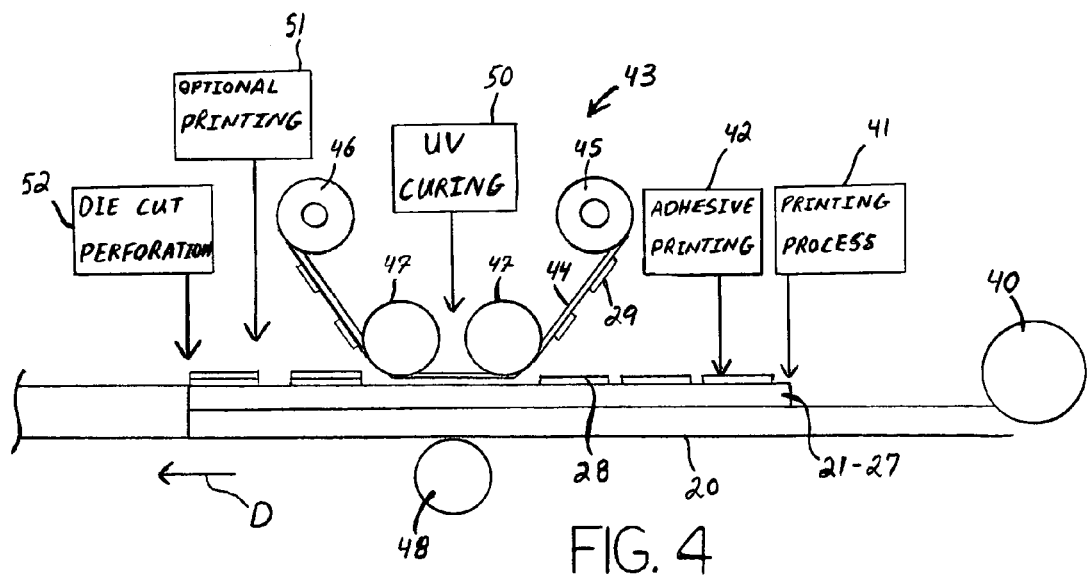
FIG. 4 is a schematic illustration of a method of manufacturing the lottery ticket of FIG. 2 or 3.

Turning now to FIG. 4 there is shown a method of forming the ticket of FIG. 2. the method includes providing the substrate layer 20 from a supply 40 which is then covered by the layers 21 through 27 by a printing process schematically indicated at 41. On top of the layers 21 through 27 is printed the adhesive layer 28 using an adhesive printing process 42.

The adhesive is generally applied using a flexographic process including a flexographic plate. The flexographic plate, with the desired image, transfers the adhesive from the conventional anilox roll to the substrate.

As indicated generally at 43 is provided a system for transferring the metalized layer 29 from a carrier film 44 onto the adhesive layer 28. Thus a metalized layer is supplied over a required width on the carrier film 44 supplied from a supply roll 45 to a take up roll 46. With the substrate moving in the direction D, the carrier film 44 is transported out under a roller 47 between which the carrier film 44 and the substrate 20 are pinched relative to a nip roller 48. This nipping action acts to attach parts of the metal layer 29 preferentially to the adhesive which are then pulled away from the carrier film 44 after the adhesive has cured in a transfer action leaving the carrier film and any remaining parts of the metal layer to be returned to the take up roll 46.

The adhesive used may be of the type available from Akzo-Nobel which is UV curable for rapid curing down stream of the transfer process 43. A UV curing system 50 is thus provided for applying curing UV light to the adhesive while the carrier film is in contact with the adhesive to complete the layers 21 through 29. Optional printing 51 can be provided down stream of the UV curing to apply additional printing layers on top of or between the sections of the metal layer and adhesive layer.

Down stream of the printing process, the tickets are cut or perforated into separate ticket sections by a dye cutting system generally indicated at 52.

The arrangement described above therefore provides a novel lottery ticket which has suitable scratching characteristics in that the selection of the adhesive, the metal layer and the scratch-off coatings is such that all of these layers break away simultaneously into fragments without the possibility for peeling or slicing a complete integral section of the coating away form the game data. The adhesive can be selected merely to provide the attachment of the metal layer to the scratch-off coating without the necessity for the adhesive being individually scratchable since it breaks down as part of the scratch-off layers. The adhesive is selected so that it does not provide an integral layer or skin which can be peeled away but instead breaks down into fragments.

The ticket provides the security system previously established in view of the presence of the layers 21 through 27 which conventionally provide the required security.

The metal layer may be used simply as a decorative coating rather than a security or scratch-off coating and therefore may be applied only over a part of the game area giving the opportunity for different graphics effects. However even if the metallic layer is applied to only selected areas it may still provide additional security effects. Thus for example it may be effective in providing further enhancements to security in terms of various types of compromise using certain chemicals for example sodium hydroxide.

The presence of the metal layer also may further enhance security in that it indicates any attempt to slice away a part or the whole of the scratch-off coatings. Thus one known mode of attack is to utilize a knife to slice off the whole of the scratch-off coating as an integral layer, to read the underlying game data and then to relay the sliced off coating over the game data. The use of a metal layer having particular reflective characteristics such as the holographic appearance or even simply a shiny reflective appearance causes the reflective characteristics to be entirely lost when the layer including the metal is sliced away due to folding or crumpling of the metal layer. Such attempts therefore are immediately visually apparent.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of manufacturing a lottery ticket comprising:
   providing a substrate layer;
   defining a game area on a front surface of the substrate layer;
   printing indicia defining game data on the substrate layer in the game area;
   the substrate layer being arranged to, or having one or more coatings thereon which are arranged to, prevent access to the game data from a rear surface of the substrate;
   applying at least one fixing layer over the game data in the game area which is arranged to prevent release of the printed game data from the substrate layer;
   applying at least one opaque scratch-off layer over the fixing layer,
   applying a rear surface of an adhesive layer onto at least a part of a front surface of the opaque scratch-off layer so that the adhesive layer when applied has an exposed front surface;
   providing a metal layer carried on a transfer carrier layer so that the metal layer has an exposed first surface and a second surface attached to the carrier layer;
   contacting the exposed first surface of the metal layer onto the exposed front surface of the adhesive layer;
   causing those parts of the metal layer which are contacted by the front surface of the adhesive layer to transfers from the carrier layer onto the front surface of the adhesive layer leaving other parts of the metal layer which are not contacted by the front surface of the adhesive layer remaining attached to the carrier layer such that the parts of the metal layer which remain attached to the carrier layer are carried away from the ticket;
   and arranging the scratch-off layer with the adhesive layer and the portions of the metal layer thereon such that the scratch-off layer, the adhesive layer and the portions of the metal layer separate from the fixing layer and break down into fragments when scratched by a player.

2. The method according to claim 1 wherein the metal layer is embossed to provide a holographic effect.

3. The method according to claim 1 wherein the adhesive is UV curable.

4. The method according to claim 1 wherein the metal layer and the adhesive layer cover substantially the whole of the game area as a solid block.

5. The method according to claim 1 wherein the metal layer and the adhesive layer cover only selected areas of the game area.

6. The method according to claim 5 wherein there is applied printed graphics between the areas of the metal layer.

7. The method according to claim 1 wherein the substrate layer includes a foil layer.

8. The method according to claim 1 wherein the substrate layer includes card or paper stock covered by coatings arranged to prevent access to game data through the substrate.

9. The method according to claim 1 wherein the metal layer comprises a single layer of deposited metal.

10. The method according to claim 1 wherein there is applied printed graphics onto the metal layer.

* * * * *